Figure 2:
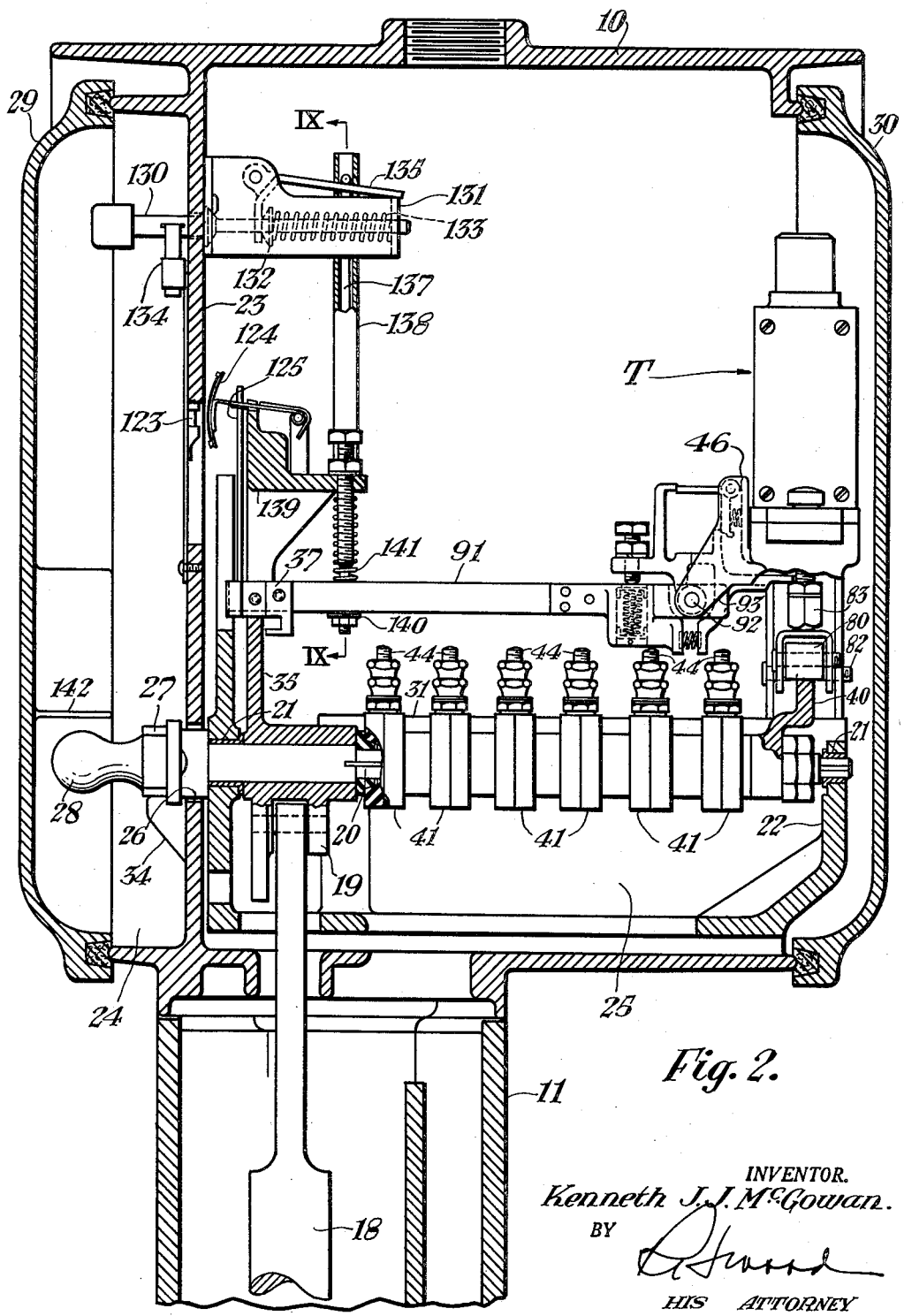

Aug. 29, 1950     K. J. J. McGOWAN     2,520,848
LOCKING DEVICE
Filed March 12, 1947     7 Sheets-Sheet 1
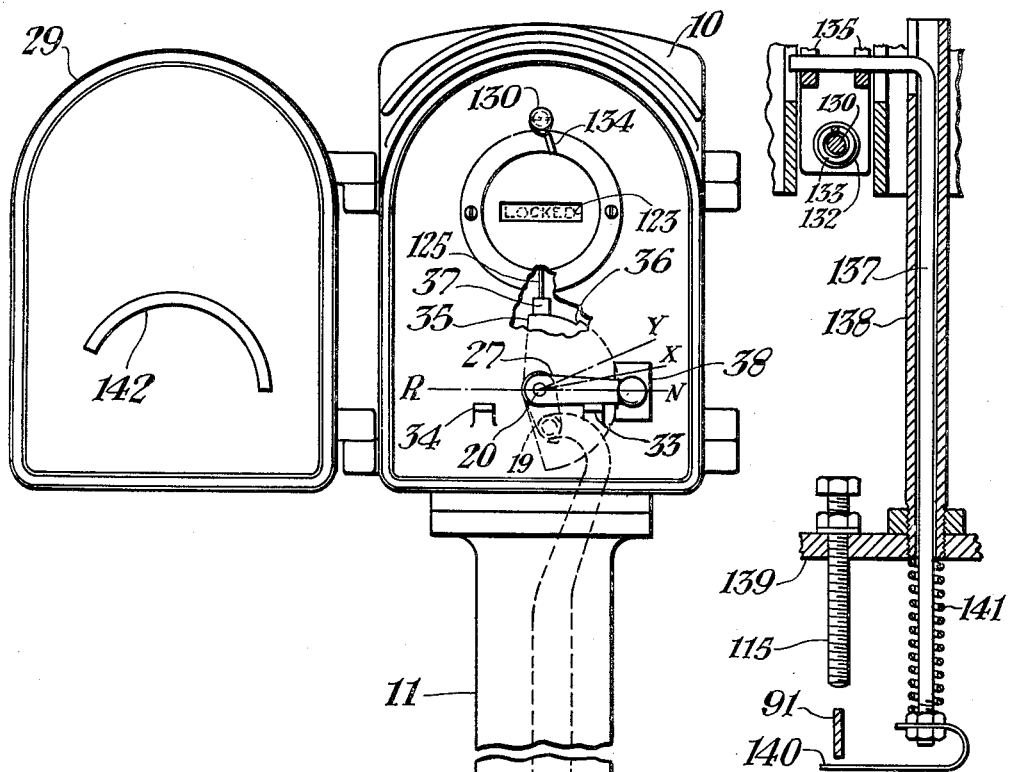
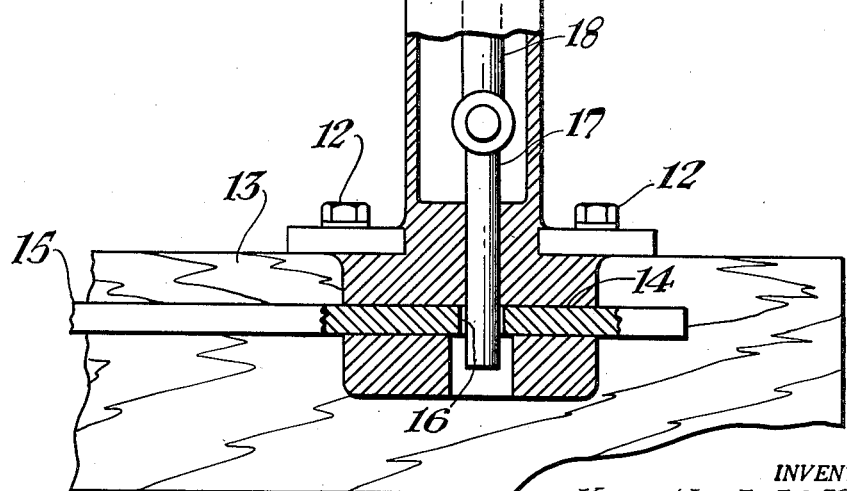
Fig. 1.
Fig. 9.
INVENTOR.
Kenneth J. J. McGowan
BY
HIS ATTORNEY Aug. 29, 1950     K. J. J. McGOWAN     2,520,848
LOCKING DEVICE Filed March 12, 1947                                  7 Sheets-Sheet 3

INVENTOR.
Kenneth J. J. McGowan
BY
HIS ATTORNEY

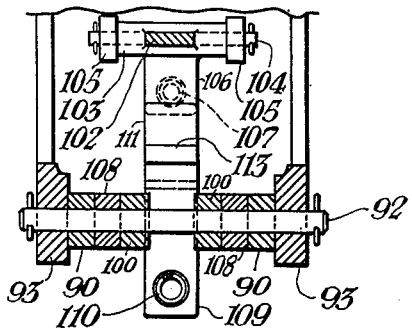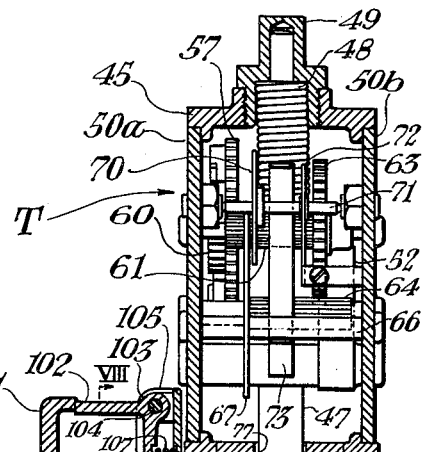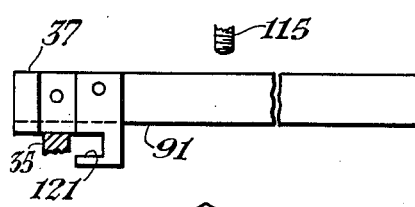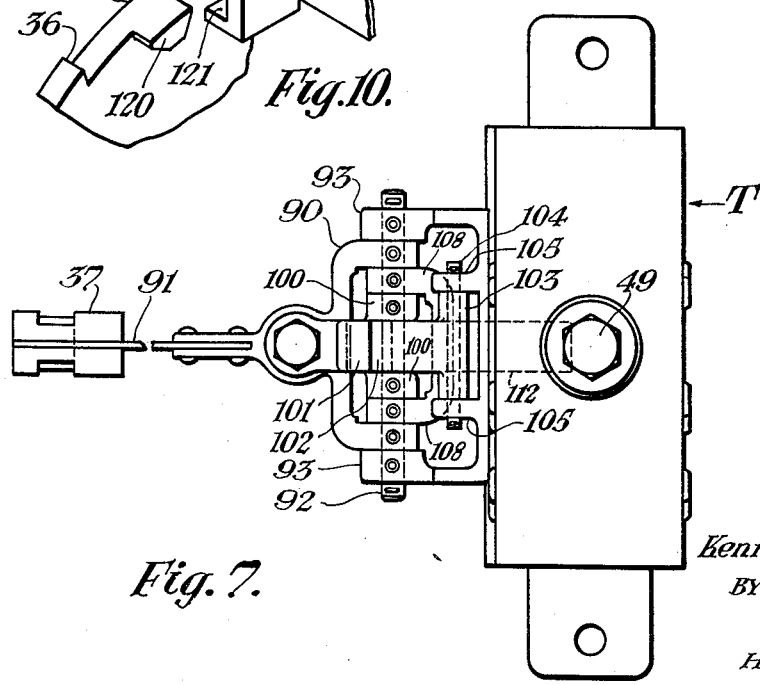

Aug. 29, 1950  K. J. J. McGOWAN  2,520,848
LOCKING DEVICE
Filed March 12, 1947  7 Sheets-Sheet 6

INVENTOR.
Kenneth J. J. McGowan.
BY
HIS ATTORNEY

Aug. 29, 1950  K. J. J. McGOWAN  2,520,848
LOCKING DEVICE

Filed March 12, 1947  7 Sheets-Sheet 7

INVENTOR.
Kenneth J. J. McGowan.
BY
HIS   ATTORNEY

Patented Aug. 29, 1950

2,520,848

UNITED STATES PATENT OFFICE 2,520,848

LOCKING DEVICE

Kenneth J. J. McGowan, Pittsburgh, Pa., assignor to The Union Switch & Signal Company, Swissvale, Pa., a corporation of Pennsylvania Application March 12, 1947, Serial No. 734,273

12 Claims. (Cl. 246—161)

My invention relates to locking devices and particularly to locking devices adapted for use in railway signaling applications. More particularly, my invention relates to locking devices incorporating mechanical time releases adapted for controlling outlying or non-interlocked track switches.

It is customary in railway signaling and traffic controlling systems to provide locks for preventing unauthorized operation of railway track switches located outside the limits of interlocking plants. In such an application the lock structure is installed on ties which support the adjacent trackway including the track switch, and the lock cooperates with a member operatively connected with the points of the switch or switches in such a manner that the points can be operated only in the event that the member is free to move. The member may comprise a lock rod connected directly to the points, a throw lever of the switch mechanism connected to the switch points through the parts of the mechanism, or the operating lever of a center stand. A locking element provided for the lock prevents movement of the member (lock rod or lever) when interposed in the path of movement of such member, and permits the member to move when withdrawn from its path of travel. The locking element is arranged to be operated into or out of the path of movement of the lock rod or lever, according as an operating member provided for the lock is in its normal or reverse position respectively, and the lock is arranged so that the operating member may be operated to its reverse position only when a locking dog is actuated out of locking engagement with the operating member. The operation of the locking dob to its unlocking condition may be controlled either locally or remotely, and in the latter case the switchman at the switch location must have the cooperation of an operator at a remote control point. In the case of local control, the switchman is able to establish operation of the locking dog without requiring cooperation from an operator at the remote control station. In either case, however, it is customary to require the switchman to perform a preliminary operation following which a time interval must elapse before the switch points are unlocked to permit operation, and during which interval the signals on the main line stretch are held at stop. This time interval is imposed by delaying the operation of the locking dog to its unlocking condition until after the expiration of the time interval following the preliminary operation made by the switchman. One form of a switch lock of this type is shown in a copending application, Serial No. 644,338, filed January 30, 1946 by William C. McWhirter and Glen V. Jefferson, now Patent 2,437,328, dated March 9, 1948.

In the case of remotely controlled locks, it has been the practice to incorporate into the lock an electromagnet effective when energized to operate the locking dog to its unlocking condition, and to carry the control circuit for the electromagnet through a contact under the control of the operator at the remote point, and another contact closed at the end of a predetermined time interval of operation of a timing relay which is set into operation by the preliminary action of the switchman at the lock. In the case of locally controlled locks, it has also been the practice to use an electromagnet in the lock for operating the locking dog and to impose the time delay period by means of an electrically operated time relay set into operation by the preliminary operation of the switchman and effective when operated to establish the energizing circuit for the electromagnet. In such locks therefore the enforcement of the time delay period has required the use of an electromagnet, an electrically operated time relay, and usually a checking relay for the timing relay.

It is an object of my invention to provide railway switch locks incorporating novel and improved mechanical time mechanisms arranged to impose a time delay in the operation of the locking dog in place of electrically operated timing relays usually used to enforce the time delay, and which mechanical time mechanisms may be utilized to provide time delays in either locally or remotely governed switch locks.

Another object is to provide railway switch locks comprising a unitary structure in which remote control of the locking dog is provided by an electromagnet in conjunction with a mechanical time release set into operation by the preliminary operation of the lock mechanism, and in which the use of electrically operated timing and checking relays is obviated.

Another object is to provide a locking device incorporating novel and improved means mechanically connecting a time release mechanism with a locking dog and arranged to operate the locking dog from its locking to its unlocking position with a snap action at the end of a predetermined time interval of operation of the mechanism.

Another object is to provide a locking device incorporating a novel and improved tripping mechanism for effecting a snap operation of a locking member.

Another object is to provide a novel and improved form of mechanical time release particularly well adapted for use in locks in railway signaling applications.

The above mentioned and other important objects and characteristic features of my invention are obtained by incorporating into the housing of a railway switch lock a mechanical time release operatively connected with the operating member of the switch lock and set into operation by the preliminary movement required of an operator directed at securing an unlock of the switch. The time release is arranged to effect operation of the locking dog to its unlocking position after the expiration of the predetermined time interval of operation of the device following the preliminary operation of the operator, and is arranged to effect such operation either electrically or mechanically according as remote control is or is not required of the lock. For remote control of the locking dog operation, the electromagnet operating the locking dog is energized by circuits governed from a remote point and broken through contacts of the time release made only after the expiration of the period of operation of the time device, while for local control the time device is mechanically connected with the locking dog by means of a tripping mechanism operative to bias the locking dog to a locking position and arranged when tripped off to operate the locking dog with a snap action to its unlocking position at the end of a predetermined time interval determined by the time mechanism.

I shall describe several forms of apparatus embodying my invention and shall then point out the novel features thereof in claims.

Figure 3:
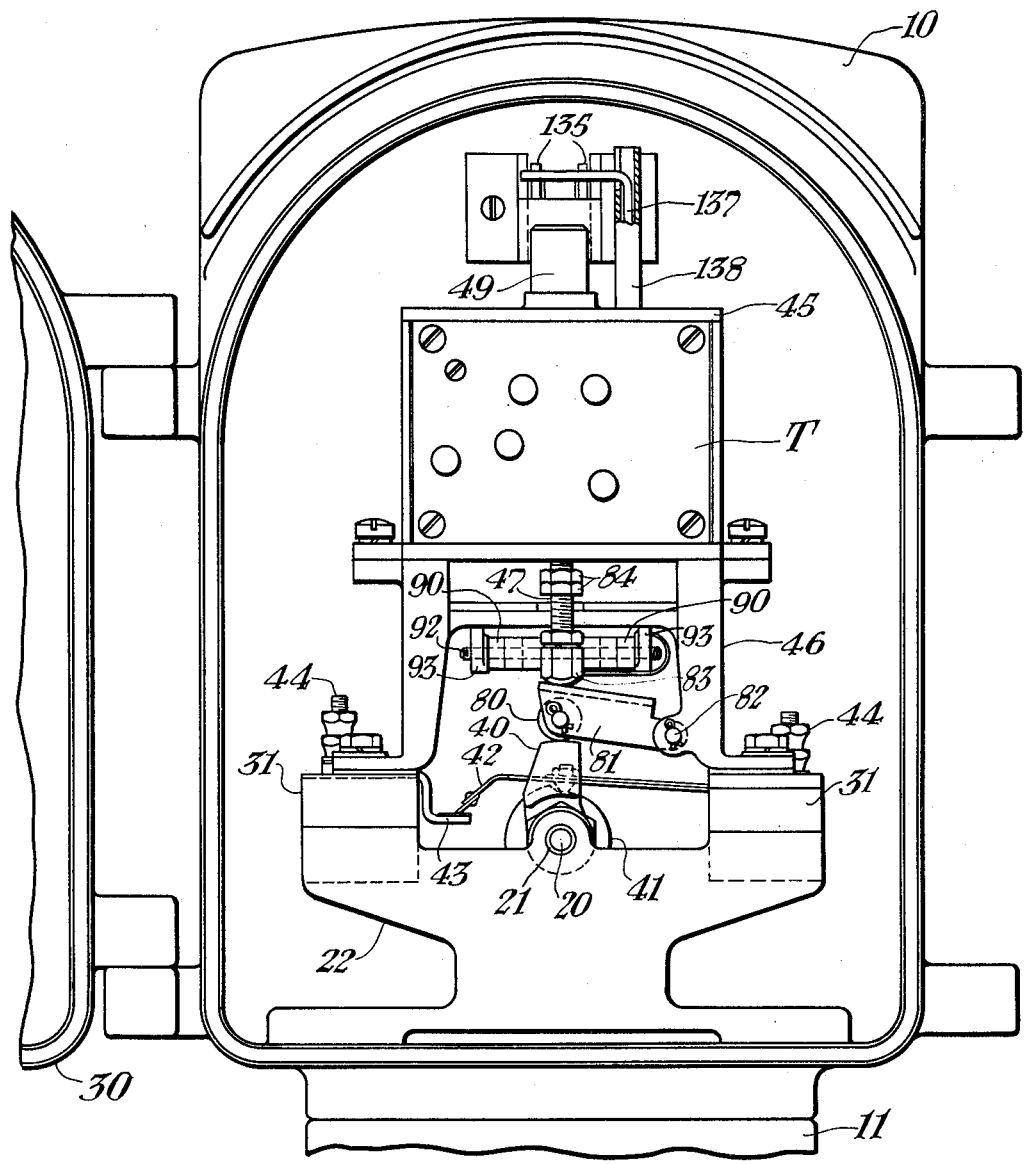
Figure 3A:
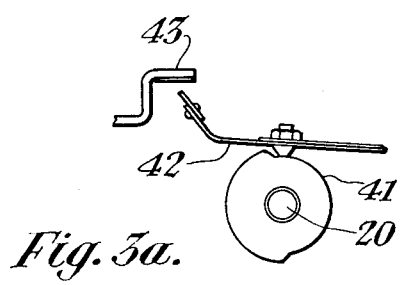
Figure 4:
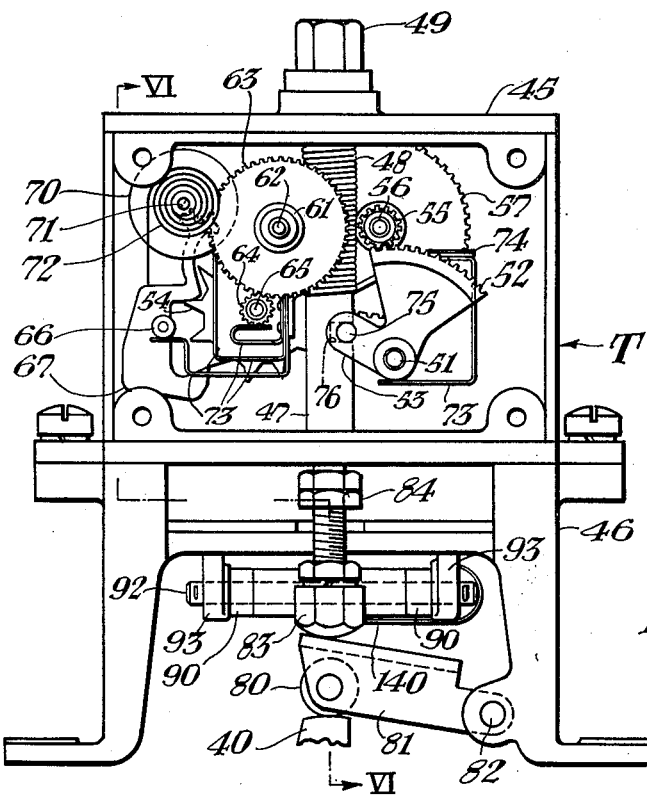
Figure 5:
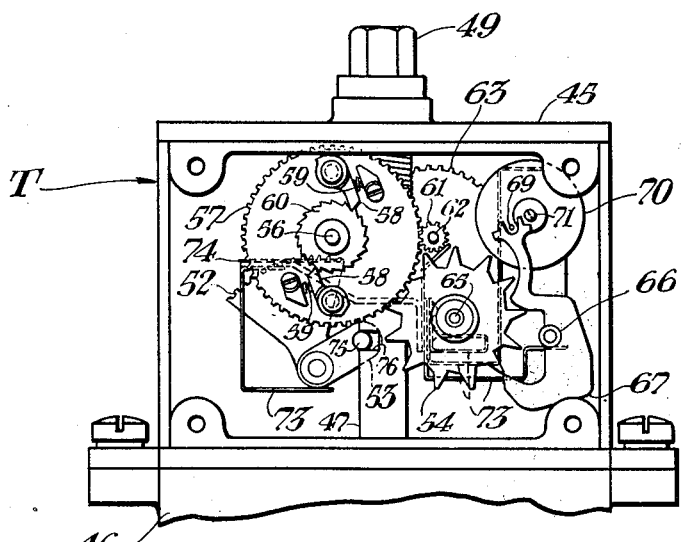
Figure 11:
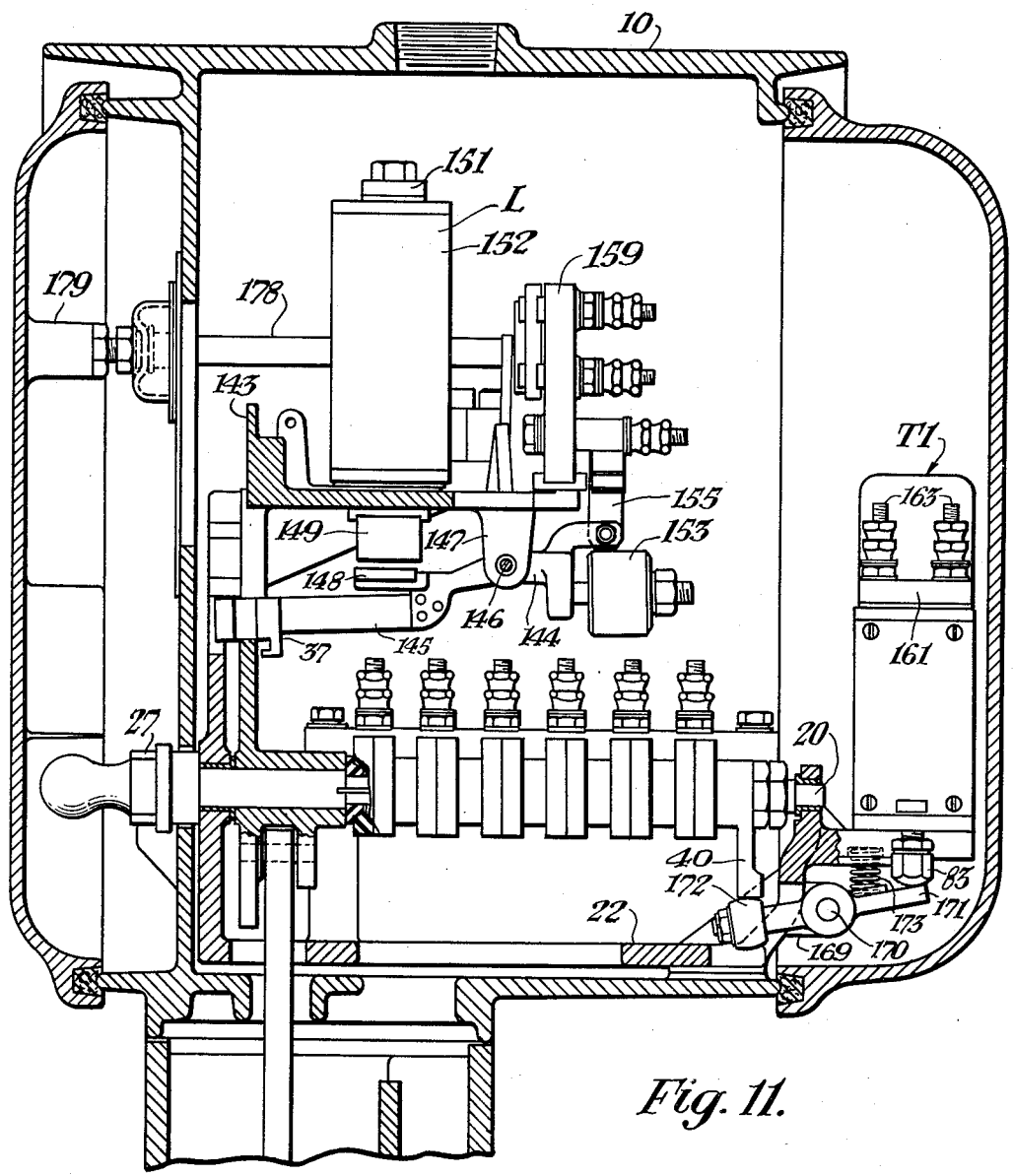
Figure 12:
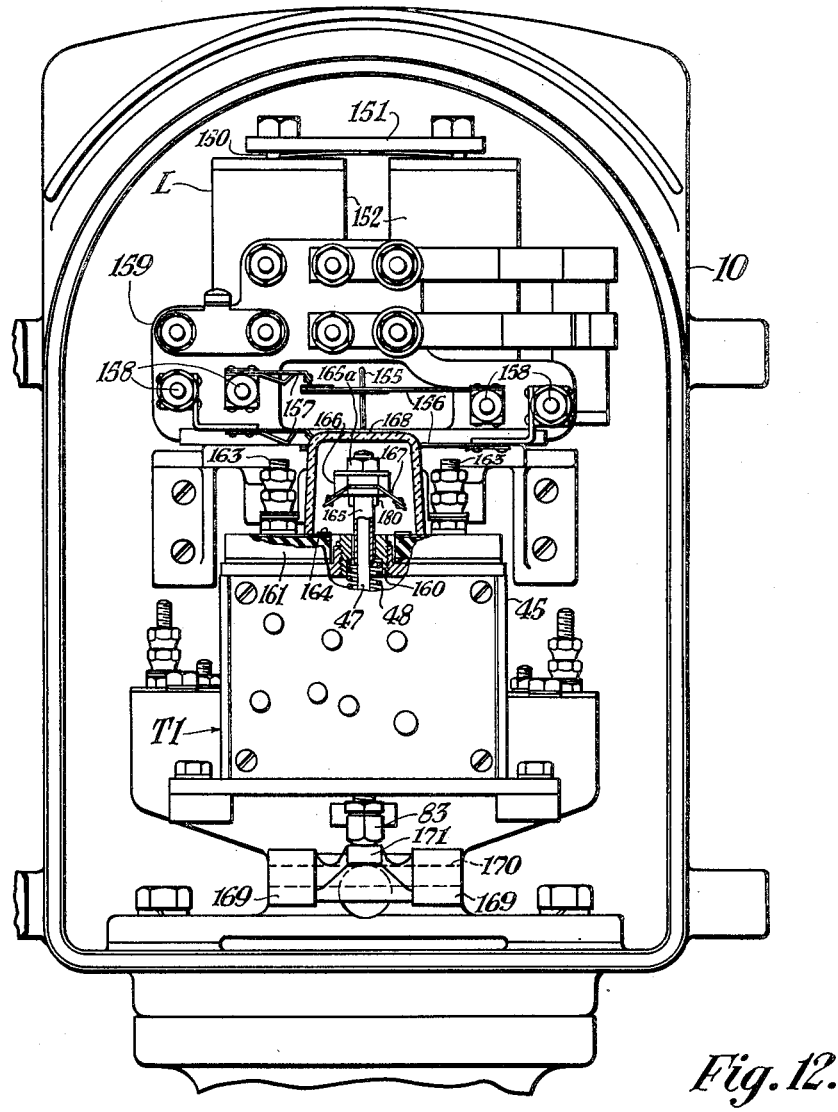
Figure 13:
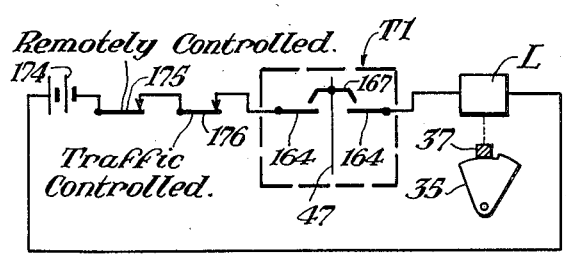

In the accompanying drawings, Fig. 1 is a front elevational view of a locking device embodying my invention applied to the lock rod of a railway track switch. Fig. 2 is a vertical view partially sectional, of one form of a locking mechanism which may be used in the lock shown in Fig. 1. Fig. 3 is a rear view of the locking mechanism shown in Fig. 2. Fig. 3a is a partial view showing a modification of a portion of the parts illustrated in Fig. 3. Fig. 4 is an elevational view showing details of construction of the time release mechanism illustrated in Fig. 3. Fig. 5 is a view showing the reverse face of the time release mechanism shown in Fig. 4. Fig. 6 is a vertical sectional view taken on the lines VI—VI of Fig. 4. Fig. 7 is a top view showing the arrangement of the time release mechanism of Fig. 4 and of the locking dog. Fig. 8 is a sectional view taken on the lines VIII—VIII of Fig. 6. Fig. 9 is a partial view taken on the line IX—IX of Fig. 2. Fig. 10 is an isometric view showing details of the lug 120 on segment 35, and slot 121 in locking dog 37. Fig. 11 is a vertical view, partially sectional, of another form of locking mechanism which may be used in the lock shown in Fig. 1. Fig. 12 is a rear view, partially sectional, of the apparatus illustrated in Fig. 11. Fig. 13 is a diagrammatic view showing a typical control circuit for the form of lock illustrated in Fig. 11.

In each of the several views, similar reference characters refer to corresponding parts.

In general, the apparatus embodying my invention is applicable to a locking device including the usual locking dog controlling the operation of an operating member operatively connected with a locking element operated into and out of the path of movement of a member secured to the points of a track switch in such a manner as to prevent movement of the points so long as the member is prevented from moving. In the particular embodiment of my invention illustrated in the drawings, the apparatus embodying my invention is represented applied to a switch lock of the well-known type illustrated in the aforementioned McWhirter et al. application, Serial No. 644,338, in which the locking element of the lock prevents operation of switch points when projected into an opening of a lock rod secured to the points of a track switch, and permits operation of the points when withdrawn from the lock rod opening.

This form of apparatus is illustrated in Figs. 1 through 10, inclusive, and comprises a casing 10 (see Fig. 1) mounted on the upper end of a support 11 which is secured as by lag screws 12 to one or more cross ties 13. Supported in a guideway 14 provided in the lower end of support 11 is a lock rod 15 of the usual type adapted to be secured to the points of a railway track switch (not shown). Rod 15 is provided with an opening 16 which, when the rod occupies a position corresponding to the normal position of the points of the associated switch, aligns with and is adapted to receive a locking plunger 17 pivotally attached to the lower end of an up-and-down rod 18 enclosed within support 11 and pivotally attached at its upper end to a crank 19. This crank is secured to an operating shaft 20 journaled in suitable bearings 21 (see Fig. 2) provided in a supporting frame 22 secured to the bottom of housing 10. A wall 23 divides housing 10 into front and rear compartments 24 and 25, respectively, and shaft 20 mounted in frame 22 disposed in rear compartment 25 projects through an opening 26 into front compartment 24 and has fastened thereto an operating member 27 in the form of a handle provided with a knob 28.

The front compartment 24 is enclosed by a door 29 hinged at one side of housing 10 and when closed is arranged to be locked in the usual manner by a padlock (not shown) which can be operated by a trainman's switch key. The rear compartment 25 is similarly enclosed by a hinged door 30 arranged when closed to be locked by a padlock which may be opened only by a maintainer's key. The doors 29 and 30 each swing outwardly to give access to compartments 24 and 25, respectively.

The operating handle 27 has a normal position N (indicated in Fig. 1), in which the handle rests against a stop 33 provided on wall 23. In this position of the handle, plunger rod 17 occupies opening 16 provided in lock rod 15, thereby projecting into the path of travel of rod 15 to prevent movement of the rod and consequently prevent any movement of the points of the associated track switch. The normal position N of handle 27 therefore corresponds to the locking position of the switch lock. Handle 27 is manually operable to a reverse position R (indicated in Fig. 1) provided that locking means referred to hereinafter is operated to its unlocking position, and in the reverse position R of handle 27, crank 19 actuated by handle 27 through shaft 20 is operated to a position such that plunger rod 17 is actuated out of engagement with rod 15 to permit movement of the latter rod and of the points of the associated track switch. The reverse position R of handle 27 therefore corresponds to the unlocked position of the switch locking device, and in this reverse position of handle 27 a stop 34 provided on wall 23 engages the handle to arrest its movement. The parts of the lock mechanism are so arranged and proportioned that handle 27 when operated to its reverse position and released, remains in that position against stop 34 until restored to its normal position.

Formed integrally on crank 19 is a lock segment 35 provided with a notched or cut-away portion having a shoulder 36 (see Fig. 1) for cooperating with a locking dog 37. The dog 37 is adapted to be operated into and out of the path of shoulder 36 and the parts are so proportioned that when dog 37 is disposed in the path of shoulder 36, handle 27 can be freely moved away from its normal position N toward its reverse position R until the handle reaches an intermediate position, designated Y in Fig. 1, in which shoulder 36 engages dog 37 to prevent further movement of handle 27 toward its reverse position and in which plunger 17 still engages opening 16 of rod 15 to prevent movement of that rod. Preferably, handle 27 is provided with latch or detent means of the type disclosed in a copending application for Letters Patent of the United States, Serial No. 693,221, filed on August 27, 1946, by William C. McWhirter, now Patent No. 2,500,616, dated March 14, 1950, for Railway Switch Locks, and which means is effective to latch handle 27 in its intermediate position against the bias of the parts tending to restore the lock to its normal position when released by the operator. Briefly, these detent means comprise a spring pressed ball carried in the knob 28 of handle 27 for cooperating with a projection or ledge 38 formed on wall 23 with the parts so proportioned that when handle 27 is in its intermediate position Y, the ball rides off the projection and engages it to latch handle 27 in that position.

Handle 27 is operatively connected with a circuit controller through the medim of shaft 20. The controller, as shown, comprises a plurality of insulating cams 41 suitably secured to shaft 20, a plurality of fixed contact fingers 43, and a plurality of movable contact fingers 42, one for each cam 41, operated by the associated cam into or out of engagement with the mating fixed contact fingers 43. The contact fingers 42 and 43 are secured by means of treminal posts 44 to insulating terminal boards 31 which in turn are secured to supporting bracket 22. As shown in Fig. 3, the contact arrangement may be such that a movable contact finger 42 engages its cooperating fixed finger 43 in the normal position of shaft 20, with cam 41 shaped to operate the finger 42 away from finger 43 when shaft 20 is rotated a few degrees away from its normal position. Alternatively, the contact arrangement may be that shown in Fig. 3a wherein a movable finger 42 is normally positioned out of engagement with its cooperating fixed finger 43 and is driven into such engagement when shaft 20 is rotated a few degrees away from tis normal position. Preferably, the cams 41 are suitably shaped so that movable fingers 42 are operated out of or into engagement, as the case may be, with the cooperating fixed fingers 43 when handle 27 is operated to a position indicated at X in Fig. 1 lying between the normal position N and the previously mentioned intermediate position Y at which the handle is latched by the detent means previously mentioned. The normally closed contact arrangement illustrated in Fig. 3 may be used in accordance with the customary practice to interrupt signal control circuits, etc., while the normally open contact arrangement shown in Fig. 3a may be used to establish a shunt across track circuits, etc. It is, of course, to be understood that by varying the shape and position of the surfaces of cams 41 the points at which movable fingers 42 engage or disengage the cooperating fingers 43 may be altered or changed to meet any particular operating requirement. Also, it is to be understood that if desired some or all of the cams 41 and the cooperating fingers 42 and 43 may be replaced by a drum type circuit controller provided on shaft 20 in a manner corresponding to the drum type controller shown provided for the electric lock in the previously mentioned copending McWhirter et al., application, Serial No. 644,338.

In accordance with my invention, I provide a time release mechanism designated by the reference character T, adapted to be mechanically connected with locking dog 37 to effect operation of that dog to its unlocking position. Mechanism T, as shown best in Figs. 4, 5, and 6, comprises a housing 45 fastened as by screws to a supporting member 46 secured to bracket 22, and includes a push rod 47 slidably mounted at its upper end (as viewed in Fig 6) in a cap member 49 threaded into an opening provided in the top member of housing 45, and projecting through an aligned opening 77 provided in the lower member of housing 45. The mounting of rod 47 permits up and down movement but preferably rotational movement of the rod is prevented by providing rod 47 with a square or hexagonal shape in that portion of the rod that projects through opening 77, and by forming the opening 77 with a corresponding shape. A coil spring 48 surrounds the upper end of rod 47 and is confined between cap member 49 and a shoulder formed on rod 47 so as to bias rod 47 constantly to the lowermost position. The rod 47 is operatively connected through a gear train with an escapement mechanism in such a manner that operation of rod 47 upwardly against the bias of spring 48 can be effected freely but operation of rod 47 downwardly in response to the bias of spring 48 is controlled by the escapement mechanism. The gear train and escapement mechanism are mounted on shafts carried in bearings provided in front and back plates 50a and 50b, respectively, secured by screws to housing 45 to enclose the working elements of the mechanism. Rod 47 is operatively connected with the gear train by means of a segment gear 52 mounted on a shaft 51 and provided with an integrally formed crank 53 carrying a pin 75 which engages a slot 76 provided on rod 47, the arrangement being such that any movement of rod 47 is communicated to gear 52 by means of the movement of pin 75 of crank 53 caused by slot 76. Segment gear 52 is connected through a train of gears with an escapement wheel 54 mounted on a shaft 65, the train as shown including a pinion 55 meshing with segment gear 52 and mounted on a shaft 56 provided with a rotatably mounted gear 57 having a pair of pawls 58 biased by springs 59 into engagement with the teeth of a ratchet wheel 60 fixed on shaft 56 in juxtaposition with gear 57, the pawls 58 and wheel 60 cooperating to permit wheel 60 to be rotated in a clockwise direction (as viewed in Fig. 5) without effecting rotation of gear 57 but effecting rotation of that gear in the event that wheel 60 operates in a counterclockwise direction. Gear 57 meshes with a pinion 61 carried on a shaft 62 provided with a gear wheel 63 engaged by a pinion 64 fixed to shaft 65 carrying the previously mentioned escapement wheel 54. A rock shaft 66 is provided with an escapement lever 67 having pawls which cooperate with the teeth of escapement wheel 54 and which lever has a slotted arm engaging a driving pin 69 carried on a balance wheel 70 mounted on a shaft 71 and connected with a hair spring 72, the arrangement being such that rotation of escapement wheel 54 is converted into reciprocating motion of escapement lever 67 which acts through its slotted arm and pin 69 to cause balance wheel 70 to oscillate in opposition to hair spring 72. The pawls of lever 67 are shaped to provide self-starting features for the escapement mechanism, by coacting with the teeth of wheel 54 to impose a torque on lever 67 effective in all positions of wheel 54 to cause balance wheel 70 to oscillate. In this arrangement, shaft 71 and escapement lever 67 are disposed with respect to each other and proportioned so that the extreme upper end of lever 67 oscillates through an arc passing through shaft 71 just short of its axis. In order to permit oscillation of lever 67 past shaft 71, a portion of the shaft is relieved by slotting to its axis, with the slot having a flat surface perpendicular to the radius of wheel 70 passing through driving pin 69. Lever 67 will oscillate past shaft 71 only when the slot of the shaft provides clearance for the lever, and this occurs only during the interval that the slotted portion of the shaft is disposed with its flat surface substantially tangent to the arc of lever 67 and with its unrelieved portion extending beyond that arc. When balance wheel 70 in oscillating rotates shaft 71 slightly away from the position mentioned, the unrelieved portion of shaft 71 then projects into the path of lever 67 to restrain movement of the lever past the shaft, thereby periodically interrupting its movement to restrain rotation of escapement wheel 54. In this arrangement, therefore, the step-by-step control of escapement wheel 54 is established by the cooperation of lever 67 with the slotted shaft 71, and the oscillation of balance wheel 70 is effective to move the unrelieved portion of shaft 71 into and out of the path of lever 67.

The portion of rod 47 that projects downwardly from housing 45 is threaded to receive an operating nut 84 which may be adjusted to assume a wide range of positions on the rod, and the extreme lower end of the rod is enclosed by a cap nut 83 which cooperates with a U-shaped driving arm 81 pivoted about a pin 82 supported in frame 46. Arm 81 carries a roller 80 engaging a cam 40 provided on shaft 20 for operatively connecting operating handle 27 with push rod 47 of time mechanism T. When handle 27 is in its normal position as represented in the drawings, cam 40 operates through roller 80 and the upper driving surface of arm 81 to hold cap nut 83 and rod 47 to their uppermost positions, in which they are illustrated in the drawings, in opposition to the bias of spring 48. When shaft 20 is rotated out of its normal position a few degrees (for example 12 degrees toward its reverse position R) the driving surface of cam 40 is removed from roller 80 which then drops clear of nut 83 and permits rod 47 to be driven downwardly by spring 48 at a rate determined by the escapement mechanism and its associated gear train, the segment gear 52 in this case rotating shaft 56 in such a direction as to drive gear 57 and ratchet wheel 60 so as to bring into play the operation of the escapement mechanism previously described. This movement of rod 47 causes a corresponding movement of operating nut 84 which functions in a manner to be explained hereinafter to trip off a tripping mechanism which may be arranged to limit the downward travel of rod 47. When handle 27 is restored to its normal position cam 40 drives roller 80 upwardly so that arm 81 forces rod 47 to its uppermost position, the rotation of shaft 56 effected by gear 52 in such event being in the direction which permits ratchet wheel 60 to rotate freely without driving gear 57 so that the escapement mechanism is removed from operation at this time.

The time release mechanism T and the connection between shaft 20 and rod 47 are specifically arranged so that the mechanism can be removed as a unit from the locking device. This removal may readily be effected merely by unscrewing housing 45 from its supporting frame 46, and lifting the mechanism away from the frame. The arrangement greatly facilitates inspection and repair of the timing unit, and not only permits the timing mechanism to be replaced as a unit but also enables the unit to be packaged separately for shipment apart from the remainder of the lock so that the unit may be assembled in operative relation in the lock after the casing 10 has been installed at its point of use. This removable feature of the timing unit affords protection for the delicate bearings and pivots of the unit against shock and vibration damage incident to the shipment and installation of the lock device.

Additional protection against shock and vibration is provided in the timing unit by means of leaf springs 73 carried by a spring arm 74 fastened to plunger rod 47. The springs 73 are proportioned to engage the shafts of the gear train and escapement mechanism of unit T when rod 47 is operated to its uppermost position, and impose a spring load on the respective shafts until rod 47 moves downwardly to cause a corresponding movement of spring arm 74 which results in removing the spring loading on the shafts to permit the shafts to rotate freely in their bearings. The spring loading is effective in the uppermost position of rod 47 to prevent damage to the bearings and pivots due to shock and vibration resulting from trains passing the point of lock installation, consequently the delicate parts of the timing unit are protected against damage from the severe vibrational disturbances to which the parts necessarily are exposed when installed for use on ties supporting the adjacent trackway.

The locking dog 37 previously mentioned forms a part of the locking means and when disposed in the path of shoulder 36 of segment 35 prevents movement of handle 27 past the dog so that in this condition of the parts the locking means is considered to be in its locked condition. The dog 37 is operatively connected with the time release mechanism through a tripping mechanism hereinafter described effective when tripped off to operate dog 37 out of the path of shoulder 36 and in this condition of the parts the locking means is considered to be in its unlocking condition. The tripping mechanism cooperates with the time release mechanism T to retain dog 37 in its full down position in the path of shoulder 36 until after the expiration of a predetermined time interval of operation of mechanism T following which the tripping mechanism is tripped off by mechanism T to operate dog 37 with a snap action to its unlocking position out of the path of shoulder 36.

The tripping mechanism, shown best in Figs. 6, 7, and 8, includes a mounting bracket 90 to which is fastened an arm 91 carrying at its extreme end locking dog 37. Bracket 90 is pivotally supported on a pin 92 journaled in depending lugs 93 provided on supporting frame 46 (see Fig. 2), and is provided with an opening 94 in which a spring 95 is compressed by top and bottom plates 96 and 97, the top plate 96 bearing against a shoulder formed in opening 94 and lower plate 97 bearing against a pin or cotter key 98 carried in suitable holes in the side walls of the opening. An adjusting bolt 99 is provided for engaging top plate 96 to compress spring 95 and thereby impose a spring load on arm 91 and dog 37 to bias that dog downwardly (as viewed in Fig. 6) into engagement with segment 35. Bolt 99 is carried in a latch lever 100 also pivoted on pin 92 and provided with an extended arm 101 adapted to be engaged by an arm 102 of a retaining lever 103 pivoted on a pin 104 journaled in lugs 105 provided on supporting member 46. Another arm 106 of lever 103 is biased by a spring 107, confined between that arm and member 46, to the position where arm 102 engages arm 101 of lever 100. An operating lever 108 also pivoted on pin 92 is provided with a lug 109 which cooperates with bracket 90 to confine a spring 110, the arrangement being such that spring 110 tends to force bracket 90 and lever 108 to rotate in opposite directions about pin 92. An arm 111 of lever 108 is adapted to engage arm 106 of lever 103 to rotate that lever in a counterclockwise direction (as viewed in Fig. 6) against the bias of spring 107, the rotation of member 103 being effective to move arm 102 out of engagement with arm 101 of lever 100. Another arm 112 of lever 108 is provided for engaging operating nut 84 of time release mechanism T, the arrangement being such that in the normal condition of the parts as shown in Fig. 6, nut 84 is disengaged from arm 112 so that lever 108 is in its normal position, arm 111 engages arm 106 of lever 103, the other arm 102 of lever 103 engages arm 101 of lever 100, and bolt 99 depresses top plate 96 to impose a spring bias an arm 91 forcing locking dog 37 into engagement with segment 35. Lever 108 is also provided with a lug 113 which in the normal position of the lever engages a cooperating lug of lever 100. When rod 47 operates downwardly, nut 84 will engage arm 112 of lever 108 to rotate that lever in a clockwise direction about its pivot pin 92, thereby compressing spring 110 confined between lever 108 and bracket 90, while arm 111 of lever 108 rotates lever 103 in a counterclockwise direction about its pivot pin 104 and causes arm 102 to move out of engagement with arm 101 of lever 100. When this happens, the parts are tripped off so that bolt 99 no longer applies a force to upper plate 96 of bracket 90, and the energy stored in spring 110 is effective to rotate bracket 90 in a clockwise direction about pin 92 and snap dog 37 out of the path of movement of shoulder 36. A stop lug provided on the end of arm 106 of lever 103 engages member 46 to limit the rotation of lever 103 and through it, the rotation of lever 108 and consequently the downward travel of nut 84 of the time release mechanism. An adjustable bolt 115, shown best in Fig. 9, is provided in the path of movement of arm 91 and limits the upward movement of that arm. When nut 84 is lifted away from arm 112 by the action of cam 40 driving rod 47 upwardly as the result of restoring handle 27 to its normal position, the parts of the tripping mechanism will be restored to their normal conditions in a manner to be explained hereinafter and in which a forcedown lug 120 (see Fig. 10) provided on segment 35 cooperates with a slot 121 formed in locking dog 37.

As is customary, the locking device embodying my invention is provided with indicating means for indicating the locked and unlocked condition of the device. These indicating means are shown in Figs. 1 and 2, and comprise a pivoted indicator visible through a window 123 provided in partition wall 23 of housing 10. The indicator may assume any one of a variety of forms but as shown comprises an arcuate member 124 rotatably positioned behind window 123 and connected by a rod 125 with locking dog 37, the arcuate member 124 being operated between two extreme positions for respectively displaying "Locked" and "Unlocked" aspects according as locking dog 37 is disposed in the path of, or is operated out of the path of, shoulder 36 of segment 35.

An emergency release may be provided for locking dog 37 and comprises a push rod 130 (see Fig. 2) slidably mounted in a bracket 131 secured to the rear face of wall 23 of housing 10 with the rod 130 projecting through the wall into front compartment 24. Rod 130 is provided with a shoulder 132 and is surrounded by a spring 133 confined between shoulder 132 and an up-turned rear portion of bracket 131 with the spring functioning to bias rod 130 to its outermost projecting position in front compartment 24. Rod 130 is provided with a knob on its outermost end and has a slot adjacent to the knob through which a car seal 134 may be inserted and sealed. The car seal 134 prevents operation of rod 130 inwardly unless the seal is broken and removed to provide a telltale, and rod 130 is provided with an operating finger 135 which cooperates with a laterally projecting portion (see Fig. 9) of a pull rod 137 supported for up and down movement in a sleeve 138 secured to a projecting boss 139 formed on the rear face of wall 23. The lower end of rod 137 carries a horizontally projecting finger 140 (see Fig. 9) which extends underneath arm 91, and has a spring 141 confined between boss 139 and the lower end of rod 137 to bias that rod constantly to its lowermost position as illustrated in the drawings. To operate the release, rod 130 is pushed inwardly and after seal 134 is sheared off (to provide a telltale), finger 135 will be driven underneath the projecting portion of rod 137 to raise that rod upwardly against the bias of spring 141, thereby lifting horizontal finger 140 which engages arm 91 to operate locking dog 37 out of the path of shoulder 36. If this operation should be made while the tripping mechanism previously described is in its normal condition illustrated in the drawings, plate 96 carried by bracket 90 will be depressed by bolt 99 so that when push rod 130 is released and springs back to its outermost position in response to the bias of its spring 133, rod 137 will likewise be operated to its lowermost position by the bias of spring 141 and arm 91 will be operated to its normal position in engagement with segment 35 in response to the bias of spring 95 imposed by the depression of plate 96 by bolt 99. The spring 95 therefore provides a yieldable connection between latch lever 100 and mounting bracket 90 so that an emergency operation of the dog can be effected manually when latch lever 100 is in its normal latching position. The spring also functions to impose a spring loading on bracket 90 effective to prevent rattling and movement of dog 37 from its locking position due to vibration caused by passing trains.

The inner face of door 29 enclosing front compartment 24 is preferably provided with a projection 142 which is shaped so that door 29 can be closed and padlocked only if handle 27 occupies its normal position. The handle can be operated to its normal position provided that plunger rod 17 enters opening 16 formed in switch lock rod 15, and this can be effected only when the points of the associated track switch are in their normal positions. In the normal condition of the locking device, therefore, the points of the associated switch are locked against operation, handle 27 is in its normal position, both doors 29 and 30 are closed and padlocked, cam 40 on shaft 20 retains plunger rod 47 in its uppermost position to wind up the parts of the release mechanism T, locking dog 37 is biased to its lower position, wherein the dog is disposed in the path of movement of shoulder 36, and the indicating means displays the aspect "Locked" through window 123.

In the form of the invention hereinbefore described, the locking dog is mechanically connected with a mechanical time release effective to operate the locking dog to its unlocking position and consequently the device is limited to those lock applications where only local control is required because no means is provided which can be subjected to control by an operator at a remote office. As a result therefore, an operator at the switch location will be able to obtain an unlock of the track switch merely by operating handle 27 of the lock, and need not receive the cooperation of another operator at a remote control point, although it will be understood that in accordance with the customary practice the operator at the switch may be required to obtain authorization from the remote operator before unlocking the points.

The manner in which local control of the switch lock is obtained by the operator at the switch location will be as follows:

If, with the parts of the apparatus in the normal condition just described, it is desired to unlock the points of the associated track switch, the operator will first remove the padlock and open door 29. Handle 27 may now be grasped and operated toward its reverse position and when the handle operates through the first few degrees of rotation, cams 41 provided on shaft 20 will operate their movable contact fingers 42 into or out of engagement, as the case may be, with their associated fixed fingers 43, the cams being preferably shaped to establish this operation of the contacts prior to the time that cam 40 is operated out of engagement with roller 80 and plunger rod 47. The next few degrees of rotation of shaft 20 moves cam 40 out of engagement with roller 80 and permits arm 81 to drop free of cap nut 83 on rod 47, thereby freeing rod 47 for movement downwardly in response to the bias of its spring 48. Movement of handle 27 may be continued at this time until the handle reaches its previously mentioned intermediate position Y at which shoulder 36 on segment 35 engages locking dog 37 to prevent further movement of handle 27 toward its reverse position. At this position of handle 27 the detent means previously mentioned will become effective to latch the handle against return to its normal position in response to the bias of the parts, and the handle may be released by the operator but will be retained in its intermediate position by the detent means.

The plunger rod 47 will be driven downwardly under the influence of spring 48 at a rate determined by the escapement mechanism and gear train of time release mechanism T. The nut 84 on rod 47 will engage arm 112 of lever 108 and rotate that lever to a position which causes arm 111 to drive lever 103 out of contact with lever 100, thereby tripping off the tripping mechanism to enable the energy stored in spring 110 to snap dog 37 upwardly out of the path of shoulder 36 to a position determined by bolt 115 disposed in the path of arm 91. The operation of locking dog 37 to its unlocking position results in the rotation of arcuate member 124 to cause that member to display "Unlocked" through window 123, thereby indicating that the time interval of operation of mechanism T has elapsed and that locking dog 37 has been operated to its unlocking condition to free handle 27 for further operation toward its reverse position R. Operation of handle 27 to its reverse position ordinarily will be effected by the operator immediately upon display of the aspect "Unlocked" and in the reverse position of handle 27, plunger rod 17 is lifted out of engagement with lock rod 15 so as to permit operation of the points of the associated track switch.

It will be understood, of course, that dog 37 will be snapped to its unlocking position at the end of a predetermined time interval required for rod 47 to move nut 84 into engagement with arm 112 of lever 108 and rotate that lever to the position where the parts of the tripping mechanism are tripped off to release the energy stored in spring 110. The predetermined time interval of operation of mechanism T required to elapse between the time that cam 40 frees rod 47 for movement downwardly, and the time that the parts of the tripping mechanism are tripped off as a result of the downward movement of rod 47, will be selected by suitably adjusting nut 84 on rod 47 with respect to certain operating conditions at the point of installation such as the spacing of signals, maximum permitted speed of operation, etc. This time interval will, of course, be selected to provide adequate protection for traffic approaching the location of the lock and its associated switch before permitting the points of the switch to be unlocked. The time release mechanism T is adapted to provide a wide range of time intervals selected by adjusting nut 84 on rod 47 and preferably the range may extend from one minute to eight minutes. It is obvious, of course, that if desired other ranges of time may be provided by mechanism T by suitable proportioning of the parts.

In the event that emergency operation of the locking device is required as for example if the time release mechanism T should fail to operate properly so that locking dog 37 is not operated out of its locking position following the expiration of a predetermined time interval of operation of mechanism T, then push rod 130 may be depressed to shear off car seal 134 and actuate pull rod 137 to cause horizontal finger 140 to lift arm 91 upwardly so that dog 37 is operated out of the path of shoulder 36. This will permit operation of handle 27 to its full reverse position irrespective of the failure of mechanism T to operate properly. The use of the emergency release will, of course, be registered by the broken seal 134 which functions as a telltale.

The switch lock device may be restored to its normal position, provided the points of the associated track switch occupy their corresponding normal positions, by operating handle 27 to its normal position. During a portion of the stroke of the handle between the intermediate Y and normal N positions of the handle, the previously mentioned lug 120 provided on segment 35 will engage slot 121 formed in locking dog 37. As can be seen in Fig. 10, lug 120 is beveled and the lower edge of slot 121 is formed with a mating bevel so that the force exerted by the operator in restoring handle 27 to its normal position, coupled with the natural bias in this position of the parts tending to restore handle 27 to its normal position, will force lug 120 into slot 121 and draw down dog 37 into engagement with segment 35. The parts are so proportioned that after lug 120 enters slot 121, cam 40 will engage roller 80 to drive plunger rod 47 upwardly and restore the parts of the time mechanism T to their normal wound up position. Nut 84 of rod 47 will therefore be removed from engagement with arm 112 of lever 108 prior to the time that lug 120 moves out of engagement with slot 121, while cap nut 83 on the lower end of rod 47 will engage arm 112 of lever 108 to rotate that lever to its normal position, and as a result the parts of the tripping mechanism will be forced to assume their normal positions, as illustrated in the drawings. In this operation lug 113 of lever 108 will engage the mating lug of lever 100 to rotate that lever to its normal position. The contacts provided for cams 41 will, of course, be operated by their associated cams in response to restoration of handle 27 to its normal position and it follows that when handle 27 reaches its normal position the parts of the device will all be restored to their normal conditions illustrated in the drawings. Door 29 may therefore be closed and padlocked, it being noted that projection 142 on the door will be effective to prevent its closure in the event that handle 27 occupies any position other than its normal position.

In the operation of this form of a locking device embodying my invention it will be noted that a mechanical time release operatively connected with a locking dog provides for operation of the dog at the end of a time interval determined by the mechanism. The mechanism therefore functions to impose a time interval before permitting unlock of switch points and obviates the use of an electrically operated timing relay heretofore required in the local control of a switch lock, as shown for example in Fig. 7 of the previously mentioned McWhirter application, Serial No. 693,221, wherein an electric lock is shown controlled by a timing relay TER. Also, the tripping mechanism through which the time release mechanism actuates the locking dog is arranged so that the locking dog is retained in its full down locking position until the end of the predetermined time interval of operation of the time release, and is then tripped off to operate the dog with a snap action to its unlocking position, and to operate the indicator to display "Unlocked." This arrangement is comparable to that obtained in an electric switch lock in which the dog is operated by the attraction of an armature to an electromagnet, and in which the movement of the dog and operation of the indicator take place immediately upon energization of the electromagnet which is effected at the end of a time interval determined by a timing relay. It follows that for local control of a switch lock, the electrical means for operating the locking dog may be dispensed with by use of apparatus embodying my invention and incorporating a time release mechanism in which the shafts are spring loaded to protect against vibration and shock of passing trains causing damage to the bearings and other parts of the mechanism.

The locking device illustrated in Figs. 1 through 10 and described hereinbefore, which provides for only local control of the operation of the locking dog, may readily be converted into an arrangement providing for remote control by means of an electromagnet which must be energized in order to obtain operation of the locking dog. The electromagnet may be placed under the control of either or both an operator at a remote control office, and traffic controlled devices such as track relays, signal repeating relays, etc. reflecting traffic conditions on the stretch of track including the switch points. The electromagnet may, for example, be used to control the operation of the time release mechanism T by means such as that shown in Letters Patent of the United States No. 2,193,906, granted on March 19, 1940 to John W. Logan, Jr., for Railway Signaling Systems, and in which a latch operated by an electromagnet cooperates with a time release mechanism to latch that mechanism against operation when the electromagnet is deenergized. Alternately, the electromagnet may be used to operate the locking dog as shown in the previously mentioned McWhirter et al. application, Serial No. 644,338, and may be controlled by the time release mechanism T modified to operate contacts over which the energizing circuit of the electromagnet is carried and which contacts are operated closed only at the expiration of the predetermined time interval of operation of the mechanism. An arrangement in which the locking dog is operated by an electromagnet controlled by contacts of a time release mechanism, is shown in Figs. 11 and 12 of the drawing, which illustrate the apparatus hereinbefore described modified to provide another embodiment of my invention.

Referring now to Figs. 11 and 12, the lock device illustrated incorporates a time element mechanism T1, in general similar to mechanism T previously described, arranged to control the energizing circuit for an electromagnet L which operates locking dog 37 by means similar to those shown and described in the previously mentioned McWhirter et al. application, Serial No. 644,338. Electromagnet L is supported by a plate 143 secured to frame 22 and the electromagnet has associated therewith a vertically swinging armature member 144 having a finger 145 carrying at its outer end locking dog 37. Member 144 is pivotally supported intermediate its ends in trunnion screws 146 screwed through lugs 147 provided on supporting plate 143, and the member 144 carries an armature 148 which cooperates with pole pieces 149 formed on the lower ends of cores 150 of electromagnet L. The cores 150 are mounted in parallel spaced relation in the supporting plate 143 and are connected together at their upper ends by a backstrap 151. Surrounding the cores are coils 152 which in practice will be connected in circuit so as to create cumulative fluxes in the cores, and which coils constitute the energizing winding for electromagnet L. Armature supporting member 144 extends rearwardly past its point of pivotal support and has secured thereto a counterweight 153 which counterbalances the weight of the armature and locking dog 37 so as to enable a reasonable degree of energization of electromagnet L to attract the armature to its energized position, and thereby lift dog 37 out of the path of travel of shoulder 36. The locking dog 37 may be operatively connected with indicating means similar to those shown in Fig. 2 but such indicating means have not been illustrated in Fig. 11 in order to simplify the drawing. The locking dog 37 may also have associated therewith an emergency release of the type shown in Figs. 2 and 9, but such a release has been omitted from Fig. 11 to avoid complicating the drawing.

The armature supporting member 144 is operatively connected by a movable insulating link 155 to movable contact fingers, such as fingers 156, which cooperate with fixed contact fingers, such as fingers 157, to form circuit controlling contacts 156—157. The contact fingers 156 and 157 are secured by terminal posts 158 to an insulating terminal board 159 mounted on the rear end of supporting plate 143. The fingers may be disposed as shown so as to complete a contact when armature 148 is in its full released position and to interrupt the contact when the armature is in its picked-up position, but it is to be understood that where desired the fingers of either or both contacts may be reversed so as to be opened or closed according as armature 148 is released or picked up.

The time release mechanism T1 shown in Figs. 11 and 12 differs from the previously described mechanism T in that no operating nut 84 is provided on the lower portion of push rod 47, and the upper portion of the rod is slidably mounted in a bushing 160 provided in an opening in the upper member of housing 45. Also, an insulating block 161 is fastened to the upper part of housing 45 and is provided with contact terminals 163 to which are attached contact fingers 164 which rest against block 161, while the upper end of rod 47 is threaded to receive an adjustable internally threaded sleeve 165 to which is secured an insulating block 166 provided with contact fingers 167. The threads on sleeve 165 and rod 47 permit the sleeve to be moved to any one of a wide range of positions on the rod merely by rotating the sleeve, while a lock nut 165a is provided on rod 47 for locking the sleeve in any selected position. The lower end of sleeve 165 fits between biasing spring 48 and rod 47 so that the sleeve may be adjusted downwardly on rod 47 from the position illustrated in Fig. 12. A cap 168 suitably fastened to block 161 encloses the upper end of rod 47 and the contact structures associated therewith. Mechanism T1 is supported on brackets formed integrally with frame 22 and extending rearwardly to enable mechanism T1 to be mounted so that rod 47 operates in a line perpendicularly intersecting the axis of shaft 20. Frame 22 is provided with an opening and with lugs 169 disposed on either side of the opening journaling a pivot pin 170 on which is pivotally mounted on operating lever 171 carrying at one end a roller 172 disposed for actuation by cam 40 and having its other end disposed to engage cap nut 83 of rod 47. Cam 40 in Fig. 11 is reversed 180° from the position in which it is shown in Fig. 3 and consequently projects underneath shaft 20, but the surface of cam 40 is shaped to correspond to the surface shown in Fig. 3 and the cam functions so that in the normal position of handle 27 of Fig. 11, rod 47 is held in its uppermost position wherein contact fingers 167 are held out of engagement with contact fingers 164. When handle 27 of Fig. 11 is rotated a few degrees toward its reverse position R, cam 40 is actuated away from roller 172 of operating lever 171, thereby permitting the other end of lever 171 to drop clear of cap nut 83. This movement of lever 171 is assisted by a spring 173 confined between lever 171 and the lower member of housing 45, the spring urging lever 171 to rotate in a clockwise direction (as viewed in Fig. 11) about pin 170. Rod 47 will therefore operate downwardly in response to the bias of spring 48 at a rate determined by the escapement mechanism and associated gear train, and at the end of a predetermined time interval will actuate contact fingers 167 into engagement with fingers 164. Further operation of rod 47 will be averted at this time by lugs 169 provided on block 166 engaging bushing 160.

It is contemplated that contact elements 164 and 167 of mechanism T1 will be included in an energizing circuit for electromagnet L, which circuit may also include a contact under the control of an operator at a remote control office and/or a contact controlled by traffic on the stretch including a track switch. A typical form of such a circuit is represented in Fig. 13 as extending from one terminal of a suitable source of current, such as a battery 174, through a contact 175 under the control of an operator at a remote control office, a contact 176 controlled as by track relays, positions of signals, etc. so as to reflect traffic conditions on the stretch, contact 164—167—164 of mechanism T1 and the energizing coils of electromagnet L to the other terminal of current source 174. Assuming that the remotely controlled and traffic controlled contacts 175 and 176 are closed, electromagnet L will become energized when contact 164—167—164 is established at the end of the predetermined time interval of operation of mechanism T1. It will be obvious that the time interval of operation of rod 47 required to close contact 164—167—164 will be selected by adjusting sleeve 165 on rod 47. The energization of electromagnet L will result in attraction of armature 148 to lift dog 37 out of the path of shoulder 36, thereby permitting handle 27 to be operated to its reverse position to unlock the points of the associated track switch. When handle 27 is restored to its normal position, cam 40 will actuate lever 171 to drive rod 47 upwardly and open contact 164—167—164.

Obviously, the typical circuit arrangement for electromagnet L shown in Fig. 13 and described hereinbefore, may be modified to incorporate other circuit expedients for energizing the electromagnet. The circuit of Fig. 13 may for example be modified to incorporate either or both a track circuit release feature for trains entering a siding from the main track, and an immediate release feature for trains leaving the siding and entering the main track when traffic conditions are clear within a given zone on the main track. The track circuit release feature incorporated into the control circuit for electromagnet L may, for example, be arranged similarly to the circuit for the switch lock shown in Fig. 3a of Letters Patent of the United States No. 2,344,573, granted on March 21, 1944 to James J. Van Horn, for Railway Traffic Controlling Apparatus, or the circuit for the switch lock shown in Fig. 4 of a copending application for Letters Patent of the United States, Serial No. 672,395, filed on May 27, 1946 by Charles B. Shields, for Railway Traffic Controlling Apparatus, in which circuits a means is provided whereby a train in the stretch affects a track circuit release of the switch lock without requiring the imposition of a time interval in the control of the lock. The immediate release of the locking for a train leaving a siding may for example be obtained by a circuit arranged similarly to that shown in Letters Patent of the United States No. 2,241,614, granted on May 13, 1941, to John M. Pelikan, for Railway Traffic Controlling Apparatus, or that shown in Letters Patent of the United States No. 2,367,723, granted on January 23, 1945 to Harvey A. Haines, for Railway Traffic Controlling Apparatus, which circuits include means whereby the switch lock can be released immediately without requiring imposition of the time interval if the main track stretch is clear within a given zone adjacent to the switch. It follows that the circuit arrangement of electromagnet L may be arranged to require imposition of a time delay in the operation of the electromagnet through the medium of mechanism T1 incorporated into the lock, or may provide for operation of the electromagnet independently of mechanism T1.

It is believed that the operation of the apparatus illustrated in Figs. 11 and 12 will be readily understood from the foregoing description taken in connection with the description of the operation of the embodiment of the invention illustrated in Figs. 1 through 10, inclusive. It should however, be noted that if desired door-operated contacts may be provided in the customary manner for the device illustrated in Fig. 11, in which a push rod 178 is mounted to be actuated by a projection 179 on door 29 so as to open or close contacts provided on terminal board 159. Also, it is to be noted that time mechanism T1 is freely removable as a unit from the lock structure and that the provision of electromagnet L in the lock permits cooperation between time element device T1 and a remote operator in the control of the unlock of a track switch.

In this connection it will be apparent that the provision of mechanism T1 in the lock casing 10 results in a unitary lock structure incorporating both the timing element and the locking element, and obviates the use of electrically operated timing and checking relays heretofore required and usually housed apart from the lock housing. The apparatus of Figs. 11 and 12 therefore provides in a unitary structure an electromechanical control of the locking dog which affords all of the functions heretofore provided in remotely controlled switch lock installations utilizing electrically operated timing devices.

Although I have herein shown and described only a few forms of locking devices embodying my invention, it is understood that various changes and modifications may be made therein within the scope of the appended claims without departing from the spirit and scope of my invention.

Having thus described my invention, what I claim is:

1. In a railway switch lock adapted for mounting adjacent a track switch for controlling the switch and including an operating member movable between two extreme positions, the combination including a locking dog operable into and out of a locking position in which it prevents movement of said operating member in one direction in a predetermined position, means for operating said locking dog into said locking position in one of said extreme positions of said operating member, latch means cooperating with said locking dog for latching said dog in said locking position, a plunger rod slidably mounted for movement between a first and a second position, means biasing said plunger rod to its said first position, means operated by said operating member in said one extreme position for operating said plunger rod against its bias to its said second position, said plunger rod being free to operate from its said second to its said first position when said operating member is moved in said one direction away from its said one extreme position, means operated by said plunger rod when driven to its said first position by said biasing means for creating forces for operating said locking dog out of its said locking position, other means operated by said plunger rod when driven toward its first position for actuating said latch means to unlatch said locking dog and permit it to operate out of its said locking position in response to said created forces, and means for controlling the rate at which said biasing means restores said plunger rod to its said first position.

2. In a railway switch lock having an operating member operable between a normal and a reverse position and a locking dog movable into and out of a locking condition in engagement with said operating member for respectively preventing and permitting movement of said operating member from its said normal position toward its said reverse position past an intermediate position, said lock including a time element mechanism having a plunger rod biased to a first position and operated by said operating member in its said normal position against its bias to a second position, said time element mechanism arranged for controlling the rate of return of said plunger rod from its said second to its said first position when said operating member is moved away from its said normal position, the combination of means controlled by said plunger rod in its said first position for operating said locking dog out of its said locking condition, said means comprising a pivoted mounting bracket carrying said locking dog, a pivoted latch member latching said mounting bracket against rotation, a pivoted operating lever, a compressible spring confined between said mounting bracket and said operating lever urging said mounting bracket to rotate said locking dog out of its said locking condition, means operatively connecting said operating member with said latch member effective upon rotation of said operating lever for operating said latch member abruptly out of latching engagement with said mounting bracket, and means on said plunger rod for rotating said operating lever to compress said spring and to unlatch said mounting bracket in said first position of said plunger rod.

3. A railway switch lock according to claim 2 in which said mounting bracket and said latch member and said operating lever are pivoted about a common axis, said spring confined between said mounting bracket and said operating lever urges said bracket and lever to rotate in opposite directions about said axis, and said means operatively connecting said operating lever with said latch member comprises a retaining lever pivoted to rotate about another axis and biased into engagement with said latch member to retain that member in engagement with said mounting bracket, said operating lever being effective upon rotation to compress said spring and engaging said retaining lever for rotating that lever out of engagement with said latch member in response to rotation of said operating lever effected by said plunger rod in its said first position.

4. A railway switch lock according to claim 3 further including a spring carried in said mounting bracket engaged by said latch member for permitting rotation of said mounting bracket to lift said locking dog out of its said locking position with said plunger rod in its said second position.

5. A tripping mechanism having in combination, a first shaft, a first member pivoted about said first shaft for rotation into and out of engagement with a second member, a latch member pivoted about said first shaft and having a first position in which it engages said first member for latching said first member into engagement with said second member and rotatable to a second position in which said first member is unlatched and free to move out of engagement with said second member, a second shaft, a retaining lever pivoted about said second shaft and biased to engage said latch member to retain it in its said first position, an operating lever pivoted on said first shaft, a spring compressed between said operating lever and said first member for urging them to rotate oppositely about said shaft with said first member urged to rotate out of engagement with said second member, means for rotating said operating lever against said spring to store energy therein, and a connection between said operating lever and said retaining lever for rotating the latter lever out of engagement with said latch member upon rotation of said operating member, whereby said retaining lever when rotated out of engagement with said latch member unlatches said first member to permit the energy stored in said spring by rotation of said operating lever to snap said first member abruptly out of engagement with said second member.

6. A tripping mechanism according to claim 5 further including a second spring carried by said first member and engaged by said latch member, said first and second springs being proportioned so that said first spring will be compressed by rotation of said operating lever while said second spring remains substantially uncompressed, said second spring permitting said first member to be rotated out of engagement with said second member while said latch member is retained in its said first position.

7. In combination, a time release comprising a plunger rod biased to a first position and freely operable against its bias to a second position, means controlling the rate of return of said plunger rod from its said second position to its first position in response to its bias, an operating lever mounted for engagement by said plunger rod for rotation from a normal position to an operated position in response to operation of said plunger rod to its said first position, a mounting bracket pivoted for rotation between a normal position and an operated position, a spring compressed between said operating lever and said mounting bracket for respectively urging said lever to its normal position and said bracket to its operated position, a latch member pivoted for rotation between a latching and unlatching position in which said latch member respectively engages and is disengaged from said mounting bracket in its said normal position to respectively prevent and permit rotation of said mounting bracket to its said operated position, a retaining lever biased to a first position in which said retaining lever retains said latch member in its said latching position and pivoted for rotation to a second position in which said retaining member disengages said latching member to permit rotation of said latch member to its said unlatching position, and means connecting said operating lever with said retaining lever effective upon rotation of said operating lever to its operated position for rotating said retaining lever to its said second position, said rotation of said operating lever storing energy in said spring effective when said retaining lever operates to its said second position to snap said mounting bracket abruptly to its said operated position.

8. A combination according to claim 7 further including a member adjustably secured to said plunger rod for engaging said operating lever to rotate that lever between its said normal and operated positions, said member being adjustable on said plunger rod so as to vary said first position of said plunger rod in which said operating lever is rotated to its operated position whereby the time of operation required for said plunger rod to return from its said second to its said first position may be selected by selecting the position of said adjustable member on said plunger rod.

9. A combination according to claim 8 further including in combination, operating means for operating said plunger rod between its said first position and said second position, said operating means having one position in which said plunger rod is operated to and held in its said second position, and another position in which said plunger rod is released for return to its said first position, means on said operating means cooperating with said mounting bracket effective in said one position of said operating means for rotating said mounting bracket from its operated to its normal position, means provided for said plunger rod for rotating said operating lever from its said operated to its said normal position upon movement of said plunger rod from its first position to its second, and means on said operating lever engaging said latch member to rotate said latch member to its latching position when said operating lever occupies its normal position.

10. A railway switch lock having an operating member operable between a normal and a reverse position and a locking dog having a locking position in which it prevents movement of said operating member in one direction in a predetermined position, said switch lock including a plunger rod movable between a first and a second position and operatively connected with said locking dog for operating said dog out of said locking position when said plunger rod operates to its said first position, means for operating said plunger rod to its said second position by said operating member, means biasing said plunger rod to its said first position, and a means in said time element mechanism controlling the rate of operation of said plunger rod from its said second position to its said first position comprising in combination, a gear train and an escapement mechanism mounted on shafts pivoted in bearings housed in said time element mechanism, means operatively connecting said plunger rod with said gear train for driving said train in one direction or another according as said plunger rod operates toward or away from its said first position, a ratchet and pawl mechanism in said gear train operatively connecting said train with said escapement mechanism only when said train is driven in said one direction, oscillatable means mounted on a shaft pivoted in bearings supported in said time release mechanism for controlling the operating of said escapement mechanism, and means carried by said plunger rod for imposing a spring loading on said shafts in said second position of said plunger rod for holding said shafts securely in their bearings to prevent damage resulting from vibration.

11. A time release comprising, in combination, a housing, a plunger rod mounted in said housing for sliding movement between a first and a second position, a spring mounted in said housing operatively connected with said plunger rod for biasing said rod to its said first position, a gear train and an escapement mechanism mounted on shafts pivoted in bearings carried by said housing means operatively connecting said plunger rod with said gear train for driving said train in one direction or another according as said plunger rod operates toward or away from its said first position, a ratchet and pawl mechanism in said gear train operatively connecting said train with said escapement mechanism only when said train is driven in said one direction, oscillatable means mounted on a shaft pivoted in bearings supported in said time release mechanism for controlling the operation of said escapement mechanism, and means carried by said plunger rod for imposing a spring loading on said shafts in said second position of said plunger rod for holding said shafts securely in their bearings to prevent damage resulting from vibration.

12. A railway switch lock comprising a unitary structure adapted for installation adjacent to the points of a railway track switch, said lock cooperating with a lockable member operatively connected with the points and movable between a normal and a reverse position corresponding respectively to the normal and reverse positions of the points, said lock comprising in combination, a locking element adapted to project into the path of travel of said lockable member for locking that member in its normal position, an operating member operatively connected with said locking element and operable between a normal and a reverse position for respectively actuating said locking element into and out of the path of said lockable element, a locking dog movable into and out of a locking condition in engagement with said operating member for respectively preventing and permitting movement of said operating member from its said normal position to its said reverse position past an intermediate position, and means for operating said locking dog out of its said locking condition, said means comprising a time element mechanism including a plunger rod biased to a first position, means operated by said operating member in its said normal position for operating said plunger rod against its bias to a second position, means operated by said plunger rod when driven to its said first position by said biasing means for creating forces for operating said locking dog out of its said locking position effective when said plunger rod reaches said first position, and means for controlling the rate at which said biasing means restores said plunger rod to its said first position to effect operation of said locking dog.

KENNETH J. J. McGOWAN.

REFERENCES CITED

The following references are of record in the file of this patent:

UNITED STATES PATENTS

| Number | Name | Date |
|---|---|---|
| 1,535,923 | Leake | Apr. 28, 1925 |
| 1,710,668 | Stephenson | Apr. 23, 1929 |
| 2,193,906 | Logan, Jr. | Mar. 19, 1940 |
| 2,261,396 | McWhirter | Nov. 4, 1941 |
| 2,342,816 | Peek | Feb. 29, 1944 |
| 2,355,989 | McGowan | Aug. 15, 1944 |
| 2,437,328 | McWhirter et al. | Mar. 9, 1948 |

Certificate of Correction

August 29, 1950

Patent No. 2,520,848

KENNETH J. J. McGOWAN

It is hereby certified that error appears in the printed specification of the above numbered patent requiring correction as follows:

Column 20, lines 51 and 52, strike out the words "means in said"; line 68, for "operating" read *operation*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*